United States Patent
Choudhary et al.

(10) Patent No.: US 10,474,318 B2
(45) Date of Patent: Nov. 12, 2019

(54) SYSTEMS AND METHODS FOR CONTROLLING THE DISPLAY OF TOOLS BASED ON DOCUMENT STATE

(75) Inventors: Gaurav K. Choudhary, Noida (IN); Vishal K. Gupta, Pitampura (IN)

(73) Assignee: Adobe Inc., San Jose, CA (US)

( * ) Notice: Subject to any disclaimer, the term of this patent is extended or adjusted under 35 U.S.C. 154(b) by 3041 days.

(21) Appl. No.: 11/691,245

(22) Filed: Mar. 26, 2007

(65) Prior Publication Data

US 2014/0304630 A1  Oct. 9, 2014

(51) Int. Cl.
| G06F 3/048 | (2013.01) |
| G06F 3/0482 | (2013.01) |
| G06F 17/21 | (2006.01) |
| G06F 3/0481 | (2013.01) |
| G06F 17/22 | (2006.01) |

(52) U.S. Cl.
CPC .......... *G06F 3/0482* (2013.01); *G06F 3/0481* (2013.01); *G06F 17/21* (2013.01); *G06F 17/2288* (2013.01)

(58) Field of Classification Search
CPC ...... G06F 3/0481; G06F 3/0482; G06F 17/21; G06F 17/2288
USPC .......................................... 715/779, 810, 255
See application file for complete search history.

(56) References Cited

U.S. PATENT DOCUMENTS

| 7,552,420 | B1 * | 6/2009 | Smith et al. | 717/121 |
| 7,689,933 | B1 | 3/2010 | Parsons | |
| 8,270,008 | B2 | 9/2012 | Kodimer et al. | |
| 2002/0149623 | A1 * | 10/2002 | West et al. | 345/765 |
| 2003/0079175 | A1 * | 4/2003 | Limantsev | 715/500 |
| 2004/0153973 | A1 * | 8/2004 | Horwitz | 715/530 |
| 2005/0075544 | A1 * | 4/2005 | Shapiro et al. | 600/300 |
| 2006/0085749 | A1 * | 4/2006 | Daniel et al. | 715/703 |
| 2006/0212301 | A1 * | 9/2006 | Olsen | 705/1 |
| 2007/0113195 | A1 * | 5/2007 | Tormey et al. | 715/781 |
| 2008/0104505 | A1 * | 5/2008 | Keohane et al. | 715/246 |

OTHER PUBLICATIONS

"Adobe Photoshop CS2 User Guide", © 2005 Adobe Systems Incorporated, pp. 21-25.
Goodnight, Eric Z., "How to Customize Photoshop", Jan. 23, 2012, 9 pages.
Gube, Jacob, Photoshop Patterns: Ultimate Guide, Sep. 17, 2010, 25 pages.
Non Final Office Action from related U.S. Appl. No. 14/140,140 dated Aug. 11, 2015, 12 pages.

* cited by examiner

*Primary Examiner* — Amy Ng
*Assistant Examiner* — Sajeda Muhebbullah
(74) *Attorney, Agent, or Firm* — Kilpatrick Townsend & Stockton LLP (57) ABSTRACT

A system comprises a display unit rendering a document in a user interface, a selection tool receiving information selecting an arrangement of invocable actions, and an association unit associating the document with the selected arrangement.

20 Claims, 7 Drawing Sheets

- DISPLAYING A SELECTION TOOL FOR SELECTING A TOOL CONFIGURATION TO BE ASSOCIATED WITH A DOCUMENT — 701
- RECEIVING INPUT VIA THE SELECTION TOOL SPECIFYING THE TOOL CONFIGURATION — 702
- ASSOCIATING THE TOOL CONFIGURATION WITH THE DOCUMENT — 703
- DISPLAYING THE TOOL CONFIGURATION IN AN INITIAL VIEW OF THE DOCUMENT ACCORDING TO THE ASSOCIATING — 704

FIG. 8

SYSTEMS AND METHODS FOR CONTROLLING THE DISPLAY OF TOOLS BASED ON DOCUMENT STATE

TECHNICAL FIELD

The present description relates generally to systems, methods, and computer program products that handle documents and, more specifically, to systems, methods, and computer program products that associate the display of tools with documents.

BACKGROUND OF THE INVENTION

Currently, there are many users who handle multiple documents every day. Typically, each document serves a particular purpose at a particular time, such that a document can be thought of as being in one or more states at any given time, e.g., "Creation", "Editing," Reviewing", "Waiting for the document to be filled (e.g., ADOBE ACROBAT® Forms)", "posted on the World Wide Web", etc. In each of these states a user may desire to perform different sets of operations on the document.

While most document creation/editing programs allow all functions to be accessed via pull-down menus, most users find that it is more convenient to access frequently-used functions via use of a toolbar (i.e., an arrangement of buttons, each of the buttons invoking an action on the document). Currently available prior art systems usually require a user to enable toolbars, or if a toolbar has already been enabled for a prior document, it will appear to the user during the opening of the next document. The user can then open or close new or existing toolbars, as desired. Further, when a first user works in a document with a toolbar opened and sends the document to a second user, the second user opens the document under his or her own opened toolbars. Accordingly, opening a document often is accompanied by locating an appropriate toolbar for a given operation. Furthermore, a user may desire different toolbars for different types of documents or for the same document in different states.

Locating toolbars can often take a significant amount of time, especially if the toolbars are hidden behind many iterations of menu selections. This can result in user inconvenience and inefficient time use.

BRIEF SUMMARY OF THE INVENTION

The present invention is directed to systems, methods, and computer program products that associate documents with arrangements of tools (e.g., toolbars, menu choices, and the like). For example, in some embodiments, a document is saved with data indicating a tool configuration that has been selected. The next time the document is opened, the program enables the selected tool configuration automatically. Thus, the user is saved the time that would usually otherwise be spent searching for the tool configuration.

In some embodiments, arrangements of tools correspond to different states of the document. For example, there may be different tool configurations available for document creation, editing, print production, and the like. A user can save a document with a tool configuration selection that is expected to correspond to the document state the next time the document is opened. In this way, the tool configuration that is provided can usually be expected to be appropriate for the operations that will be performed on the document, thereby saving the user time and increasing convenience.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
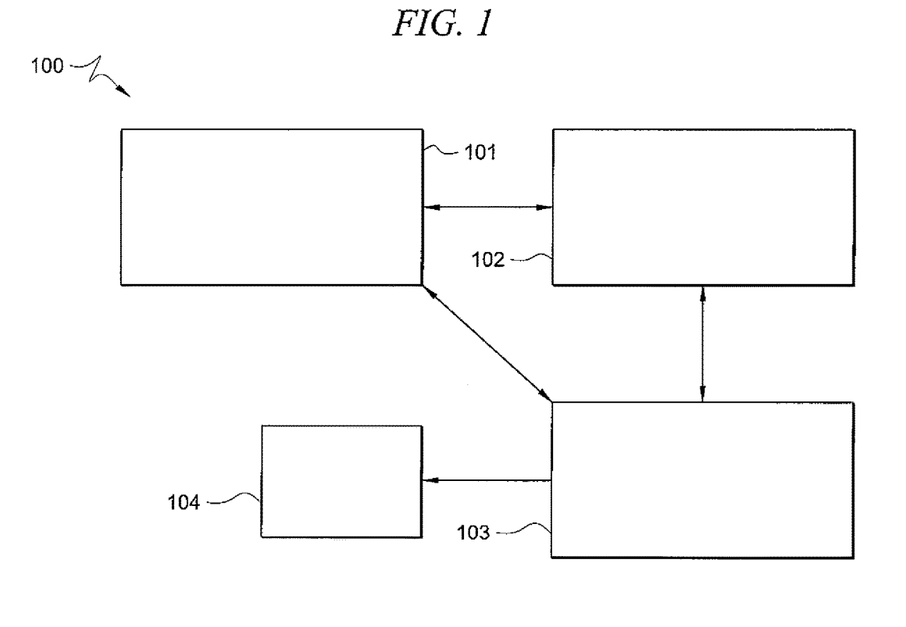
FIG. 1 is an illustration of an exemplary system adapted according to one embodiment of the invention.

FIG. 1 is an illustration of exemplary system 100 adapted according to one embodiment of the invention. System 100 includes three functional units 101-103, which, in this example, are subroutines of a computer software program. Other embodiments of the invention may employ firmware and/or hardware for any of functional units 101-103. System 100 includes, in this example, display unit 101, which displays a document in a user interface. An example of a display unit includes a part of a computer program that reads a document and determines its display for a user. System 100 also includes tool configuration selection unit 102, which receives information selecting a tool configuration.

Examples of tool configurations include toolbars that are arranged to include specific tools and menu arrangements. An example of a tool configuration selection unit is a pull-down menu, a pop-up window, a dialog, or the like in a user interface that receives user input. System 100 further includes association unit 103 associating a document with the selected tool configuration. In one example, a user employs a menu to select an appropriate tool configuration for the document, and association unit 103 saves data to the document file indicating the selected tool configuration. Saved data can take the form of data structure 104.

Functional units 101-103 are shown as separate units for convenience of illustration, and there is no requirement in various embodiments that functional units 101-103 be separate subroutines, programs, or be located on separate pieces of hardware. For instance, in one example embodiment functional units 101-103 are part of the same computer program and are executed by the same processor.

Figure 2A:
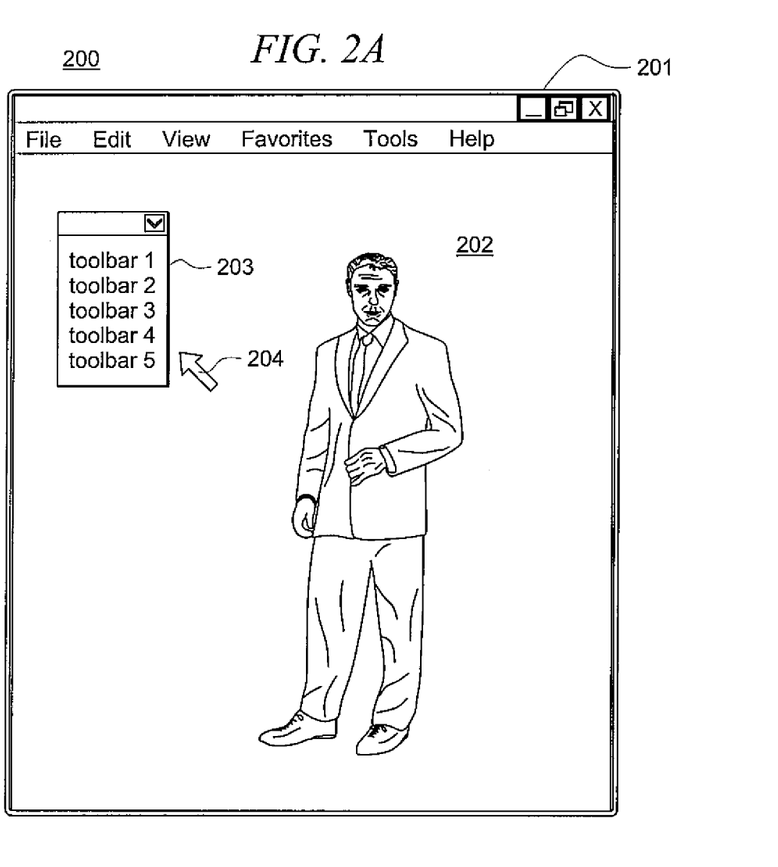
FIG. 2A is an illustration of an exemplary system adapted according to one embodiment of the invention.

FIG. 2A is an illustration of exemplary system 200 adapted according to one embodiment of the invention. System 200 includes user interface 201 that is displaying document 202. User selection interface 203 displays a list of toolbars for selection (where toolbars are one kind of tool configuration). A user can use cursor 204 to select one or more of the toolbars in interface 203 to be associated with document 202.

Figure 2B:
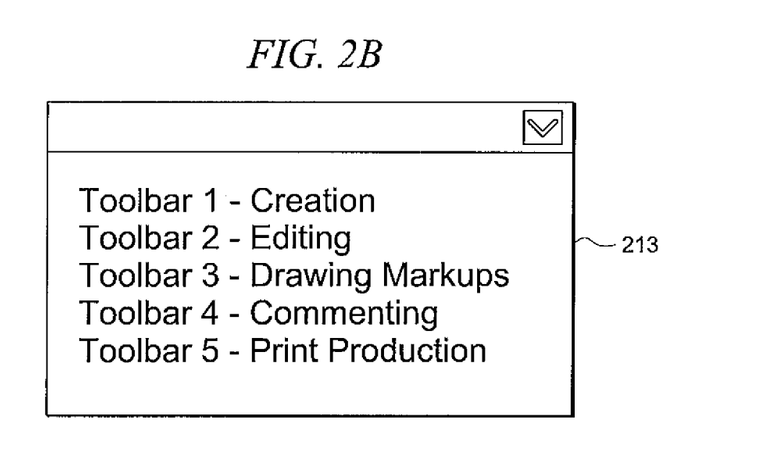
FIG. 2B shows an exemplary pull-down menu adapted according to one embodiment of the invention.

Interface 203 is shown as a pull-down menu, but (as mentioned above) it can be any kind of utility for selection including a pop-up window, a dialog, and/or the like. Various embodiments of the invention associate tool configurations with different possible states of document 202. For instance, FIG. 2B shows example pull-down menu 213 that lists document states with the toolbar choices. For example, toolbar 1 is a creation toolbar, and it may include buttons that invoke a variety of actions (e.g., object insert, text box insert, crop, etc.) that are usually expected to be of use during the creation phase of a document. Menu 213 is, of course, an example, as any technique to show that various tool configurations correspond to document states is within the scope of the invention.

After a user selects an appropriate toolbar, system 200 associates the selected toolbar with document 202. In this example, the association persists though document 200 may be closed and reopened, and it may last until it is replaced by a new association or simply deleted.

Further, in this example, the user may come to the end of the creation state of document 200 and may be ready to send the document to be edited. Whether the editing user is the same or different from the creating user, there is a likelihood that the editing process will be more efficient if the editing user is supplied with an editing toolbar that is associated with document 200. Accordingly, the user may select the editing toolbar before sending document 200 for editing. In this way, the initial view of document 200 will include the editing toolbar, thereby saving the editing user the time that is usually spent hunting for and applying the editing toolbar himself or herself.

It is also possible that the creating user sends document 200 to the editing user without having selected the editing toolbar. In such a case, the editing user may select the editing toolbar himself or herself. While this may not save the editing user time the first working session with document 200, it may save time should the editing user close and reopen the document, since the association of the toolbar with the document is persistent.

Figure 3:
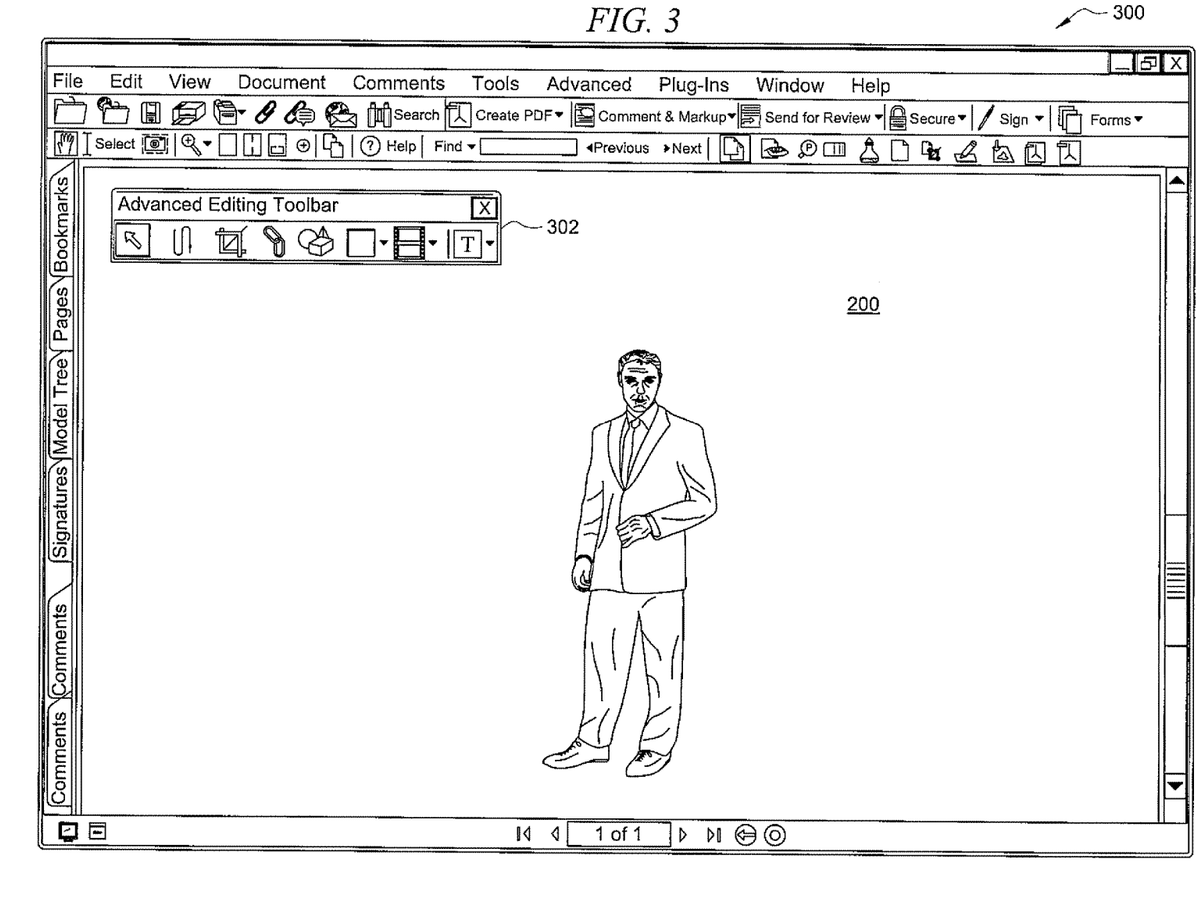
FIG. 3 is an illustration of an exemplary initial view of a document adapted according to one embodiment of the invention.

FIG. 3 is an illustration of exemplary display 300 of document 200 adapted according to one embodiment of the invention. FIG. 3 illustrates the initial display of document 200 after opening (i.e., an initial view), provided that it is associated with editing toolbar 302 at the time it is opened. For instance, an editing user may be provided with display 300 should a creating user associate document 200 with editing toolbar 302 before sending document 200 for editing.

Editing toolbar 302 includes buttons that invoke various actions that are generally expected to be invoked often in the editing state. For example, editing toolbar 302 includes buttons for an object selection tool, a cropping tool, a World Wide Web link tool (e.g., to set and manage properties of Web links), a 3D tool (e.g., to interact with three-dimensional objects), a button tool (e.g., to create and manage buttons), a movie tool (e.g., to add movies and sounds to a document), and a text touch-up tool.

Figure 4:
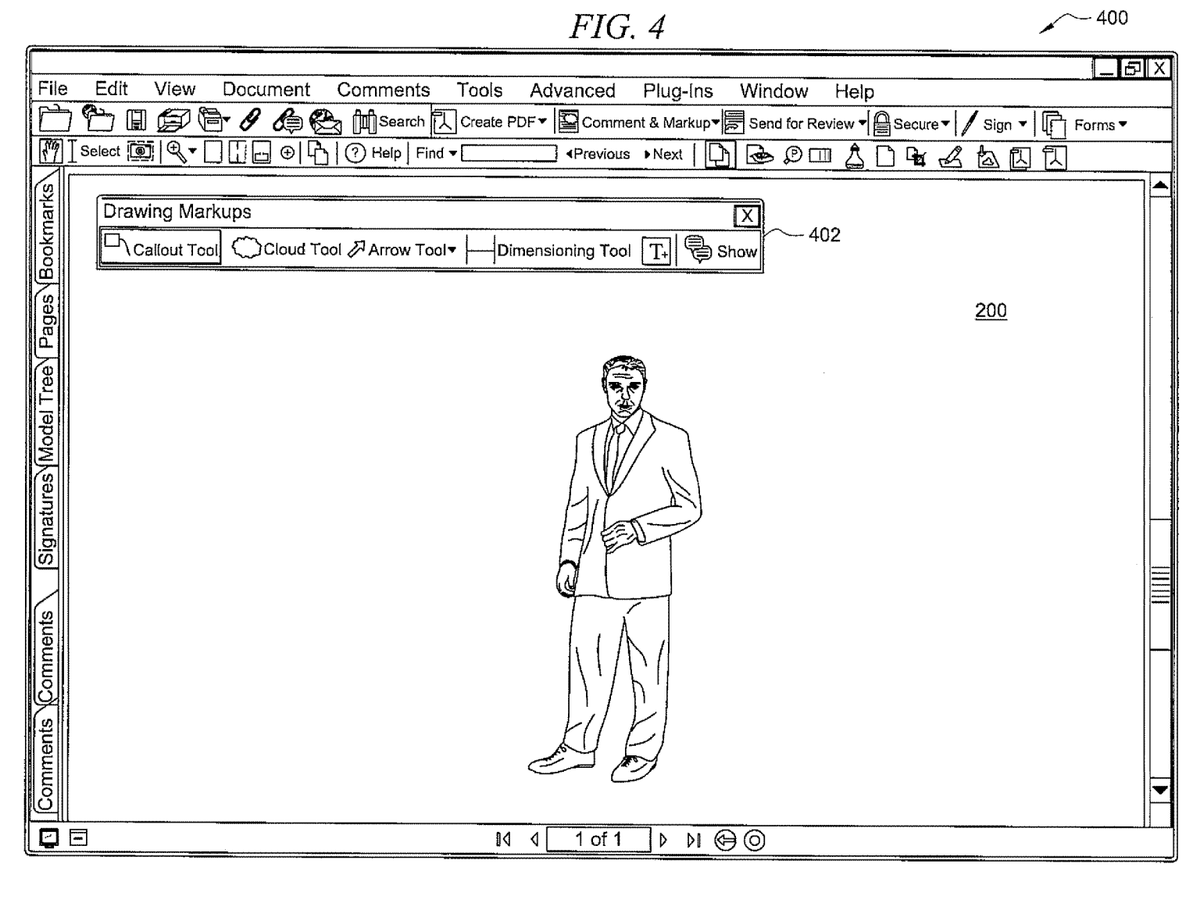
FIG. 4 is an illustration of an exemplary initial view of a document adapted according to one embodiment of the invention

When the editing user is finished, he or she may prepare to send document 200 for drawing markups by using a selection interface (such as menu 213 of FIG. 2B) to select a drawing markups toolbar and then saving document 200. When the drawing markups user opens document 200, he or she sees initial view 400, as shown in FIG. 4. Initial view 400 includes drawing markups toolbar 402, which includes buttons that are generally often used during the drawing markups state of a document. For example, drawing markups toolbar 402 includes buttons for a callout tool, a cloud tool, an arrow tool, and a dimensioning tool.

Figure 5:
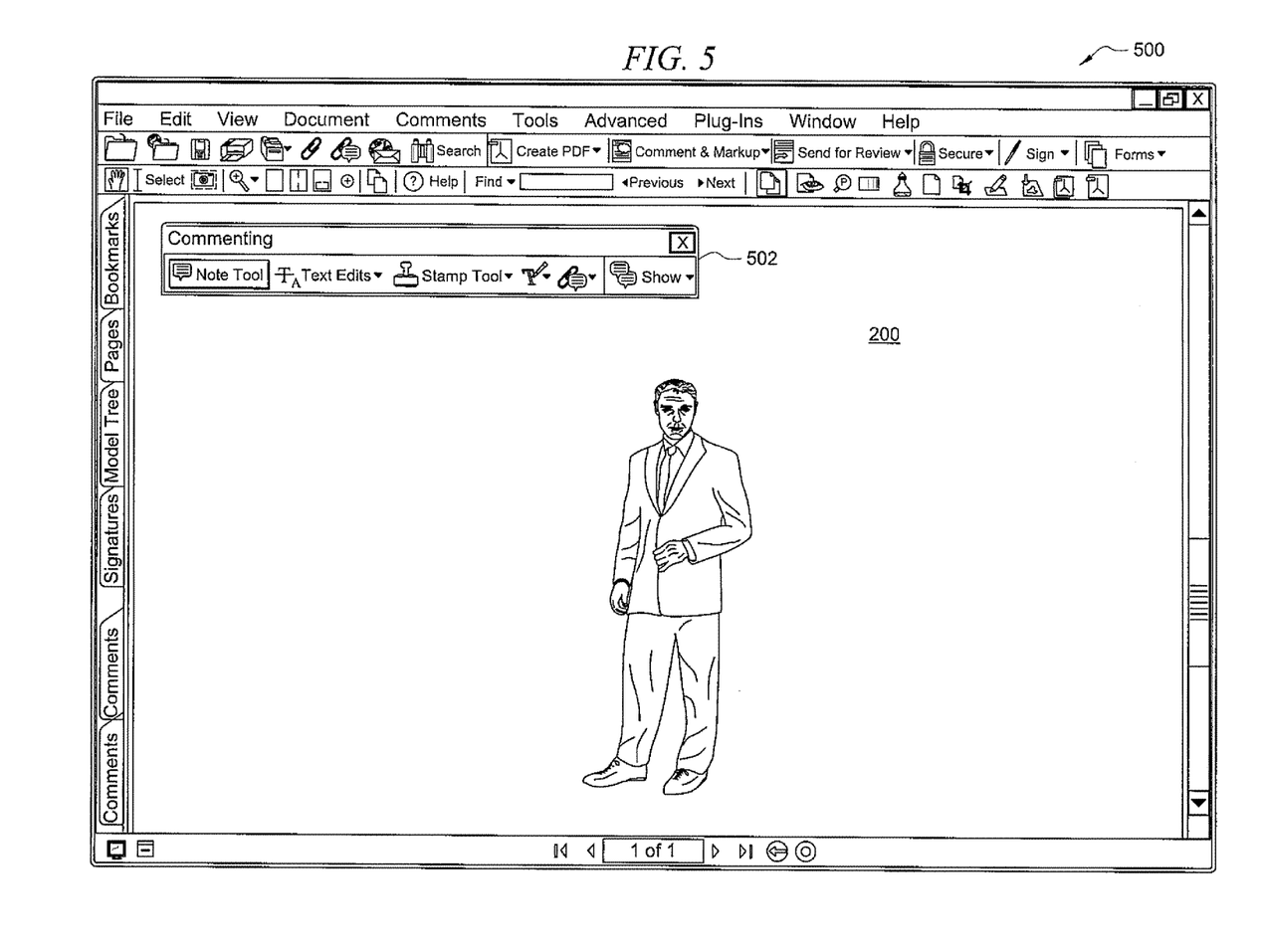
FIG. 5 is an illustration of an exemplary initial view of a document adapted according to one embodiment of the invention.

FIG. 5 is an illustration of exemplary initial view 500 of document 200 adapted according to one embodiment of the invention. Similar to FIGS. 3 and 4, FIG. 5 shows initial view 500 that includes a specified toolbar—in this case, commenting toolbar 502. Toolbar 502 includes buttons that are generally often used during the commenting state of a document, such as for a note tool, a text edits tool, a stamp tool, and the like.

Figure 6:
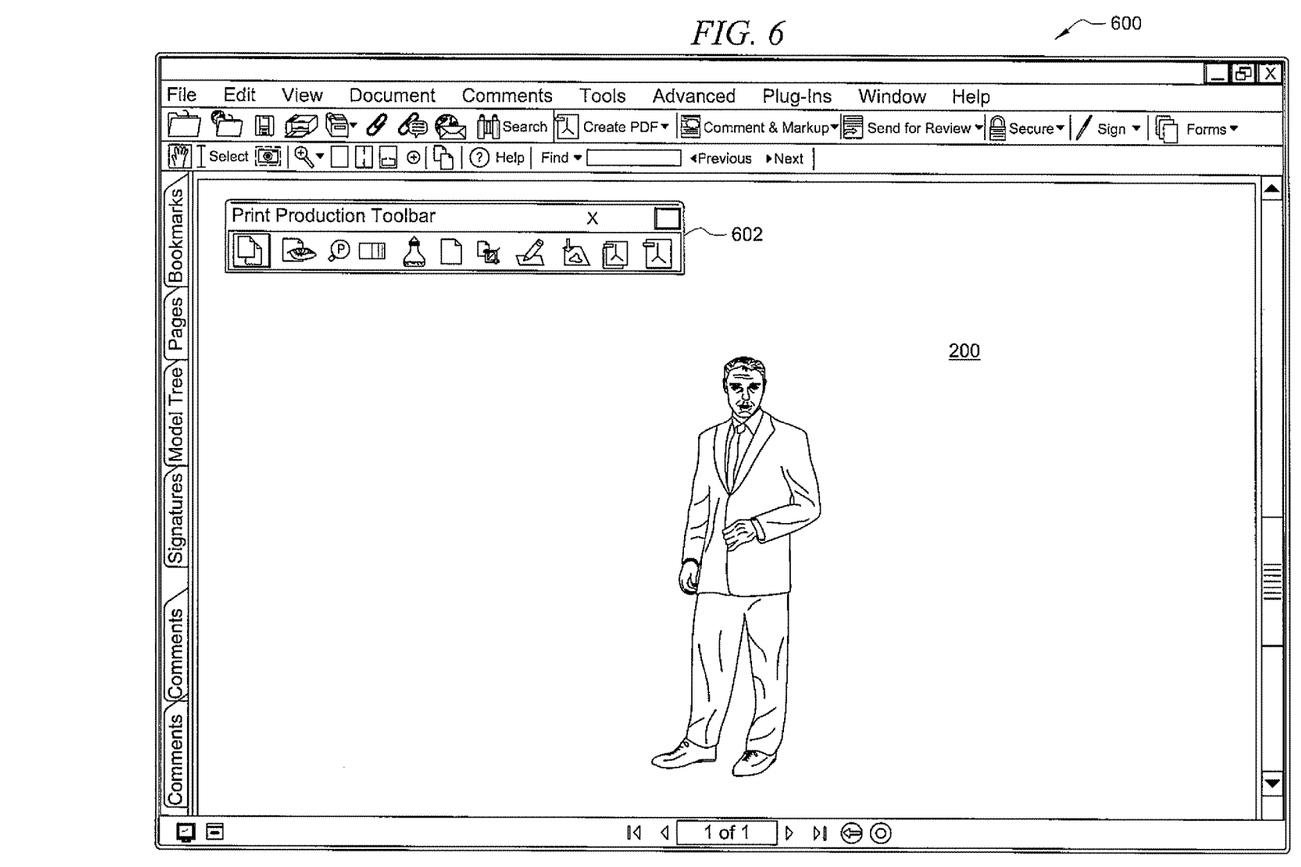
FIG. 6 is an illustration of an exemplary initial view of a document adapted according to one embodiment of the invention.

Moreover, FIG. 6 is an illustration of exemplary initial view 600 of document 200 adapted according to one embodiment of the invention. Initial view 600 includes a specified toolbar 602 for the print production state of document 200. Print production toolbar 602 includes buttons for a trap settings tool, an output preview tool, a preflight tool (e.g., allows a user to check a file before printing), a convert colors tool, an ink manager tool, an add printer marks tool, a page crop tool, a hairline fix tool (e.g., sets a minimum rule width to protect hairline rules), a transparency flattening tool, a Portable Document Format (PDF, available from Adobe Systems, Incorporated) optimizer tool, and a Job Definitions Format (JDF, a standard of The International Cooperation for the Integration of Processes in Prepress, Press and Postpress Organization) tool.

FIGS. 2B-6 refer to a plurality of states for a document. However, the list of states shown is not meant to be limiting, nor is it exclusive. For instance, other embodiments may provide support for a list of states that adds states, omits states, and/or rearranges the order of states. Further, the above examples refer to toolbars. However, it should be noted that various embodiments of the invention can associate a document with any type of tool configuration, including arrangements of menu choices.

Figure 7:
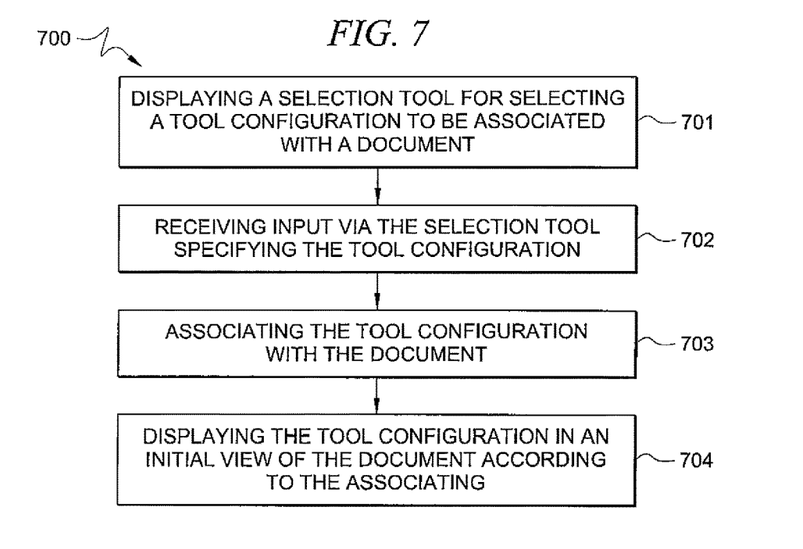
FIG. 7 is an illustration of an exemplary method adapted according to one embodiment of the invention.

FIG. 7 is an illustration of exemplary method 700 adapted according to one embodiment of the invention. Method 700 may be performed, for example, by a processor-based device (e.g., a personal computer) running a software program that provides tool configurations.

In step 701, a selection tool is displayed for selecting a tool configuration to be associated with a document. An example of a selection tool is pull-down menu 213 of FIG.

2B. It should be noted that in FIG. 2A, selection tool 203 is shown concurrently with document 202 such that the selection of a tool configuration is understood to apply to the currently active document; however, some embodiments are not limited thereto. For instance, another embodiment may provide an interface that allows a user to select a tool configuration and select a document that is not open or currently active (e.g., by using a list of previously opened documents or known related documents).

Further, it is not necessary that a selection tool explicitly show that a tool configuration is being selected. For instance, some embodiments may simply allow a user to specify a document state, which a computer program then correlates with a tool configuration. Such indirect tool configuration selection is within the scope of the invention. In one example, a prompt appears when a user sends a document over a network (e.g., by email), the prompt asking the user to select a document state for the recipient. Additionally or alternatively, such a prompt may appear when a document is opened by a recipient or on command. The particular appearance and/or timing of the selection tool can be varied among many different embodiments.

In step 702, input is received via the selection tool specifying the tool configuration. For instance, a user may employ a pointing device to move a cursor and signal a selection.

In step 703, the tool configuration is associated with the document. As mentioned above, some embodiments associate a tool configuration with a document by saving data in the document file that indicates a tool configuration selection. Additionally or alternatively, the data may indicate a document state or provide some other kind of indication that leads to a tool configuration selection.

Saving data to the document file is only one way of associating a tool configuration with a document. Another technique is to save tool configuration indication data to the local machine, and if the document is sent to another user, sending the data in a file that accompanies the document file. However, tool configuration indication data can generally be kept very small when compared to the size of a document file so that including the data in the document file usually does not change the size of the document file appreciably.

In step 704, the tool configuration is displayed in an initial view of the document according to the association. For instance, if the document is associated with an editing tool configuration, then the initial view of the document will include the editing tool configuration. FIGS. 3-6 show toolbars appearing within the workspace of their associated documents in the initial views. However, displaying "in an initial view" is not necessarily limited to displaying within the workspace of a document, as a tool configuration may be displayed above, below, or to the side of a document's workspace.

In some embodiments, the displaying of the document is preceded in step 704 by one or more actions. For instance, step 704 may include receiving a request (e.g., from a user) that the document be opened and accessing information in the document to determine the configuration of tools to be displayed upon opening the document.

Method 700 is shown as a series of discrete steps. However, other embodiments of the invention may add, delete, repeat, modify and/or rearrange various portions of method 700. For example, steps 702 and 703 may be repeated to associate multiple tool configurations with a document and/or to associate multiple documents with tool configurations.

Some embodiments of the invention are best described with regard to a data structure (e.g., 104 of FIG. 1) that is used to provide the association of a document (e.g., document 200) with a toolbar. As mentioned above, the data structure can be metadata saved to the document file or data in a separate file. An example of a data structure is information saved to a computer readable medium that expresses the following concept in executable code: "When the document is opened, render toolbar A at location X, Y in the user interface." Execution of the code causes the display of the selected toolbar. Other functions that may be embodied in data structures according to one or more aspects of the invention may include determining toolbars for display based at least in part on the computer program that is opening the document. For example, instructions such as "when the document is opened by ADOBE ACROBAT®, render toolbar A at location X, Y in the user interface," and/or "when the document is opened by ADOBE PHOTOSHOP®, render toolbar B at location X, Y in the user interface," may also be included in such a data structure.

Embodiments of the present invention are different from prior art systems and methods. For instance, currently available prior art systems do not associate tool configurations with documents. Instead, whichever tool configuration was in use prior to the opening of a document will appear to the user during the opening of the next document. The user can then open or close new or existing tool configurations, as desired. Any tool configuration opened by the user in a given document stays unless specifically closed by the user. Also, when a first user works in the document with a tool configuration opened and sends the document to a second user, the second user opens the document under his or her own opened tool configurations. This is in contrast to various embodiments of the present invention that allow specified tool configuration to be opened automatically, regardless of a previous document's tool configuration.

Embodiments of the present invention may provide one or more advantages over prior art techniques. For instance, a user may be saved the time usually spent locating the appropriate tool configurations for doing stage-appropriate operations on a document that he or she has received, assuming an appropriate tool configuration has already been associated with the document.

Further, some users work with many documents in a day, with many of the documents being in different stages. In some embodiments, selected tool configurations are displayed when the user opens a document regardless of the tool configurations used with other opened documents, such that a user may be saved the time usually spent re-enabling the tool configurations when switching between documents.

Embodiments of the invention can be implemented in a variety of software programs, such as web design software, graphics software, document creation/editing software, word processors, spreadsheets, and the like. It is not uncommon for users of such programs to handle up to twenty documents in a day. If a person spends an average of two minutes hunting for or re-enabling toolbars the user is wasting around forty minutes per day. Thus, various embodiments of the invention may contribute significant time savings every day.

When implemented via computer-executable instructions, various elements of embodiments of the present invention are in essence the software code defining the operations of such various elements, the software code embodied in a tangible, nontransitory medium. The executable instructions or software code may be obtained from a readable medium (e.g., a hard drive media, optical media, EPROM, EEPROM, tape media, cartridge media, flash memory, ROM, memory stick, and/or the like). In fact, readable media can include any tangible, nontransitory medium that can store information.

Figure 8:
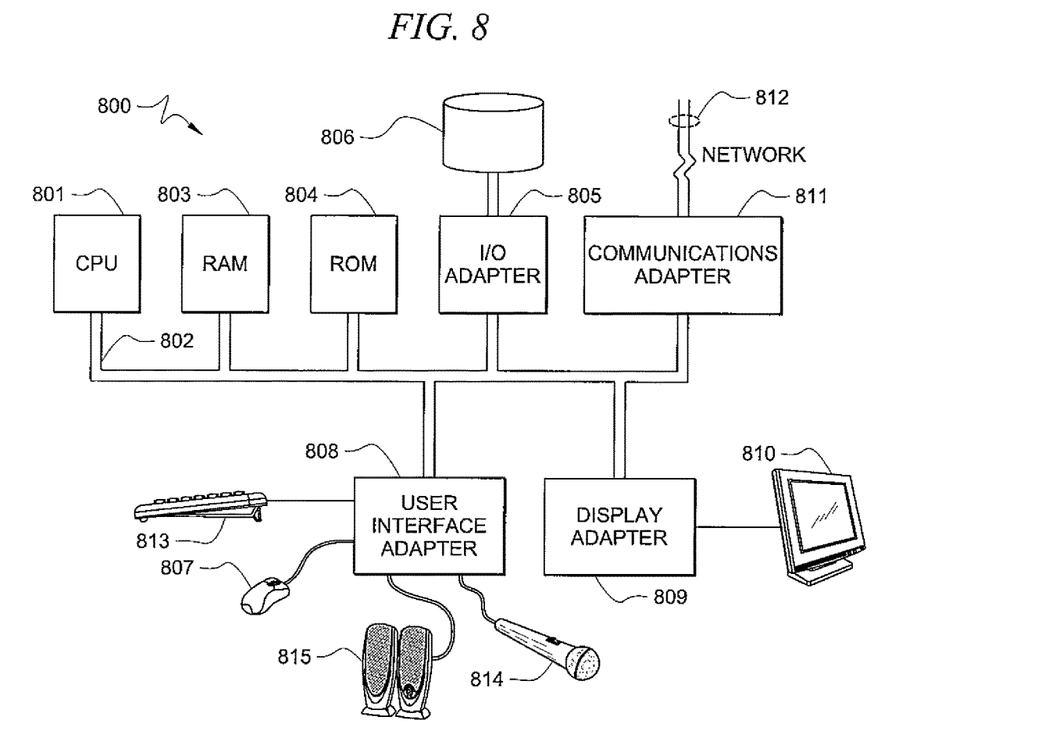
FIG. 8 illustrates an exemplary computer system adapted according to one embodiment of the present invention.

FIG. 8 illustrates exemplary computer system 800 adapted according to one embodiment of the present invention. That is, computer system 800 comprises an example system on which embodiments of the present invention may be implemented (e.g., such as a computer running a program that handles documents). Central processing unit (CPU) 801 is coupled to system bus 802. CPU 801 may be any general purpose CPU. However, the present invention is not restricted by the architecture of CPU 801 as long as CPU 801 supports the inventive operations as described herein. CPU 801 may execute the various logical instructions according to embodiments of the present invention to perform, e.g., method 700 (FIG. 7).

Computer system 800 also preferably includes random access memory (RAM) 803, which may be SRAM, DRAM, SDRAM, or the like. Computer system 800 preferably includes read-only memory (ROM) 804 which may be PROM, EPROM, EEPROM, or the like. RAM 803 and ROM 804 hold user and system data and programs, including, for example, documents and metadata.

Computer system 800 also preferably includes input/output (I/O) adapter 805, communications adapter 811, user interface adapter 808, and display adapter 809. I/O adapter 805, user interface adapter 808, and/or communications adapter 811 may, in certain embodiments, enable a user to interact with computer system 800 in order to input information, such as toolbar selection, as with computer pointing device 807. In addition, it may allow for the output of data, as with speakers 815 and monitor 810.

I/O adapter 805 preferably connects to storage device(s) 806, such as one or more of hard drive, compact disc (CD) drive, floppy disk drive, tape drive, etc. to computer system 800. The storage devices may be utilized when RAM 803 is insufficient for the memory requirements associated with storing data for applications. Communications adapter 811 is preferably adapted to couple computer system 800 to network 812 (for example, the Internet, a Local Area Network (LAN), Wide Area Network (WAN), Public Switched Telephone Network (PSTN), cellular network, and the like). User interface adapter 808 couples user input devices, such as keyboard 813, pointing device 807, and microphone 814 and/or output devices, such as speaker(s) 815 to computer system 800. Display adapter 809 is driven by CPU 801 to control the display on display device 810 to, for example, display the user interface (as in FIGS. 2A-6) of embodiments of the present invention.

It shall be appreciated that the present invention is not limited to the architecture of system 800. For example, any suitable processor-based device may be utilized, including without limitation personal computers, laptop computers, handheld computing devices, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented method, comprising:
    displaying a selection tool for selecting one of a plurality of toolbars to be associated with a document, each toolbar corresponding to a respective document state specific to a stage of finality of the document or a user role for the document;
    receiving input via said selection tool specifying a particular toolbar of the toolbars;
    associating the particular toolbar with said document by saving data within the document indicating a corresponding document state that corresponds to the particular toolbar;
    presenting a prompt to a user that asks the user to select a new document state for a recipient who will receive the document;
    receiving a selection of the new document state for the recipient who will receive the document; and
    associating a new toolbar with the document by saving additional data within the document indicating the new document state for the recipient who will receive the document.

2. The method of claim 1, wherein associating the particular toolbar with said document comprises:
    saving the data indicating the corresponding document state in a file separate from said document.

3. The method of claim 1, further comprising:
    displaying the particular toolbar in an initial view of said document based on accessing, when the document is opened, the saved data indicating the corresponding document state.

4. The method of claim 1, wherein saving the data within the document indicating the corresponding document state comprises saving the data indicating that the corresponding document state is one of:
    a creation state;
    an editing state;
    a review state;
    a blank, prepared to be filled state; or
    a posted state.

5. The method set forth in claim 1, wherein the saved data indicating the corresponding document state associates the corresponding document state with the entire document.

6. The method of claim 1, wherein associating the particular toolbar with the document is based on receiving the input specifying the particular toolbar and input selecting the document when the document is not open and not currently active.

7. The method of claim 1, wherein a correlation of the particular toolbar to the corresponding document state is specified by the user.

8. A computer program product having a tangible, non-transitory computer readable medium embodying computer program logic, said computer program product comprising:
  code which, when executed by a computing system, causes the computing system to display a utility for selecting, from a plurality of tool configurations, a tool configuration to be associated with a document;
  code which, when executed by the computing system, causes the computing system to receive a selected tool configuration and determine a document state corresponding to the selected tool configuration, wherein the document state is one or more of a plurality of different document states that the document can be in at a given time specific to a respective stage of finality of the document, wherein the respective stage of finality relates to at least one of document creation, document editing, document review, waiting for the document to be filled, or the document being posted;
  code which, when executed by the computing system, causes the computing system to create an association between said document and said selected tool configuration by saving data within the document identifying the document state corresponding to the selected tool configuration;
  code which, when executed by the computing system, causes the computing system to present a prompt to a user that asks the user to select a new document state for a recipient who will receive the document;
  code which, when executed by the computing system, causes the computing system to receive a selection of the new document state for the recipient who will receive the document; and
  code which, when executed by the computing system, causes the computing system to associate a new toolbar with the document by saving additional data within the document indicating the new document state for the recipient who will receive the document.

9. The computer program product of claim 8 wherein said selected tool configuration comprises a toolbar.

10. The computer program product of claim 8, further comprising:
  code which, when executed by the computing system, causes the computing system to send a file with said document and said saved data identifying the document state to another computer over a network.

11. The computer program product of claim 8, further comprising:
  code which, when executed by the computing system, causes the computing system to open said document and display said selected tool configuration in an initial view of said document based on the data identifying the document state.

12. The computer program product set forth in claim 8, wherein the data identifying the document state identifies the document state as applying to the entire document.

13. A computer-implemented method comprising:
  receiving a request to open a document using an application;
  in response to said request, accessing information associated with the document to determine an arrangement of tools to be displayed by the application;
  opening said document with the application;
  displaying the arrangement of tools with said document, wherein determining the arrangement of tools to be displayed comprises accessing data associated with the document and identifying a document state specific to a user role for the document, wherein the arrangement of tools corresponds to the identified document state, the data associated with said document and identifying the document state is included in said document;
  presenting a prompt to a user that asks the user to select a new document state for a recipient who will receive the document;
  receiving a selection of the new document state for the recipient who will receive the document; and
  associating a new toolbar with the document by saving additional data within the document indicating the new document state for the recipient who will receive the document.

14. The method of claim 13, wherein the data associated with the document indicates a state of the document during an access previous to said opening.

15. The method of claim 13 further comprising:
  receiving a request for another tool arrangement; and
  displaying said other tool arrangement.

16. The method set forth in claim 13, wherein the data associated with the document and identifying the document state associates the document state with the entire document.

17. A computer program product having a tangible, non-transitory computer readable medium embodying computer program logic, said computer program product comprising:
  code which, when executed by a computing system, causes the computing system to access a file including a document;
  code which, when executed by the computing system, causes the computing system to read information within said file including the document, said information specifying a document state specific to a stage of finality of the document or a user role for the document; and
  code which, when executed by the computing system, causes the computing system to determine the document state, determine an arrangement of tools corresponding to the document state from a plurality of potential arrangements of tools, each potential arrangement corresponding to a particular document state, and open said document,
  wherein opening the document comprises displaying the determined arrangement of tools;
  code which, when executed by the computing system, causes the computing system to present a prompt to a user that asks the user to select a new document state for a recipient who will receive the document;
  code which, when executed by the computing system, causes the computing system to receive a selection of the new document state for the recipient who will receive the document; and
  code which, when executed by the computing system, causes the computing system to present associating a new toolbar with the document by saving additional data within the document indicating the new document state for the recipient who will receive the document.

18. The computer program product of claim 17, wherein the arrangement of tools represents an arrangement corresponding to a state that was set when the document was last accessed.

19. The computer program product of claim 18, further comprising:
  code which, when executed by the computing system, causes the computing system to display a utility for selecting, from the plurality of potential arrangements of tools, another tool arrangement to be associated with said document.

20. The computer program product of claim 17, wherein said arrangement of tools comprises a toolbar.

\* \* \* \* \*